United States Patent Office 2,991,214
Patented July 4, 1961

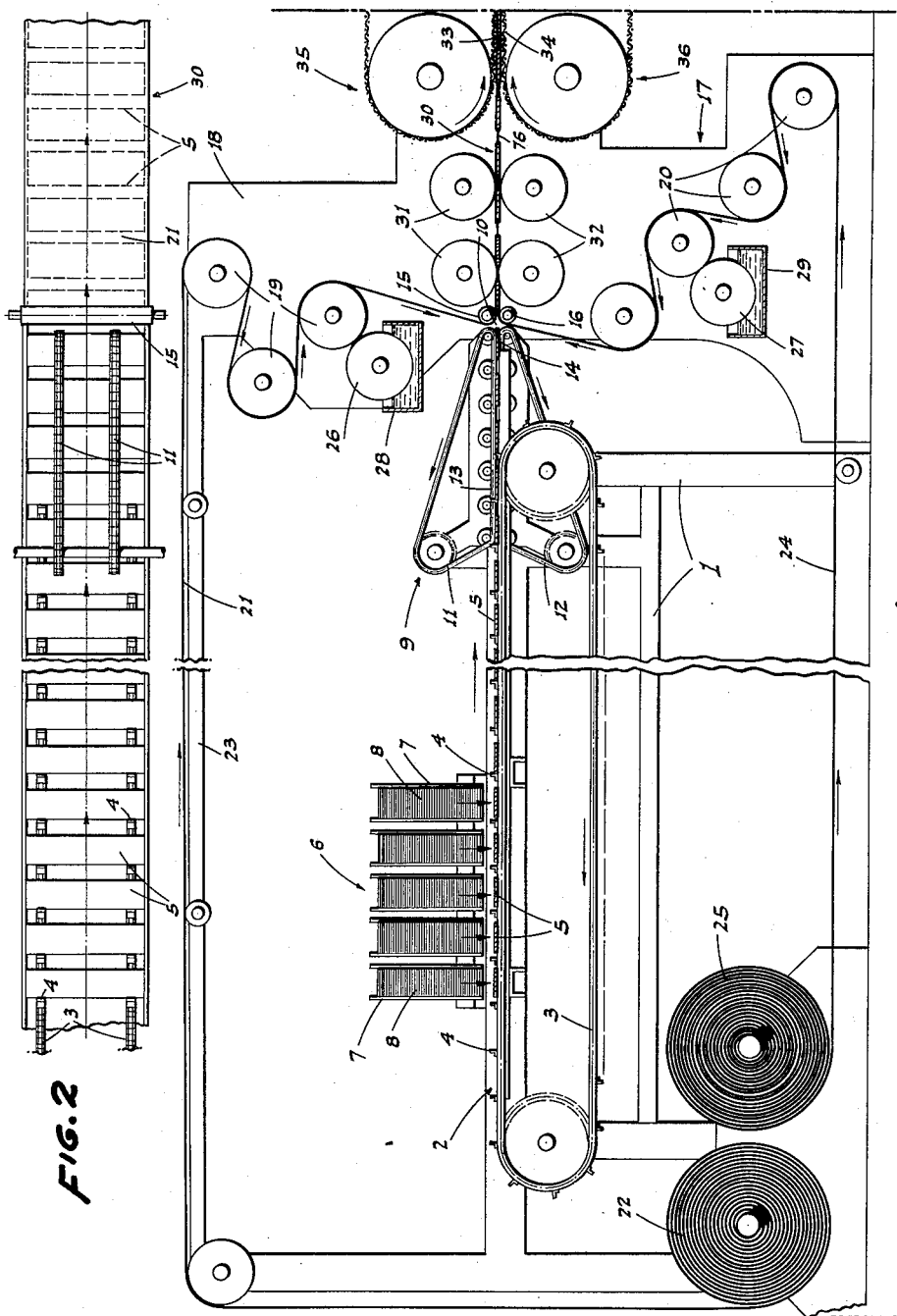
July 4, 1961 C. A. BURKHOLDER 2,991,214
METHOD OF MANUFACTURING COMPOSITE PAPER
AND VENEER SHEET MATERIAL
Original Filed July 16, 1954 3 Sheets-Sheet 1
INVENTOR.
Claude A. Burkholder
BY
ATTORNEYS

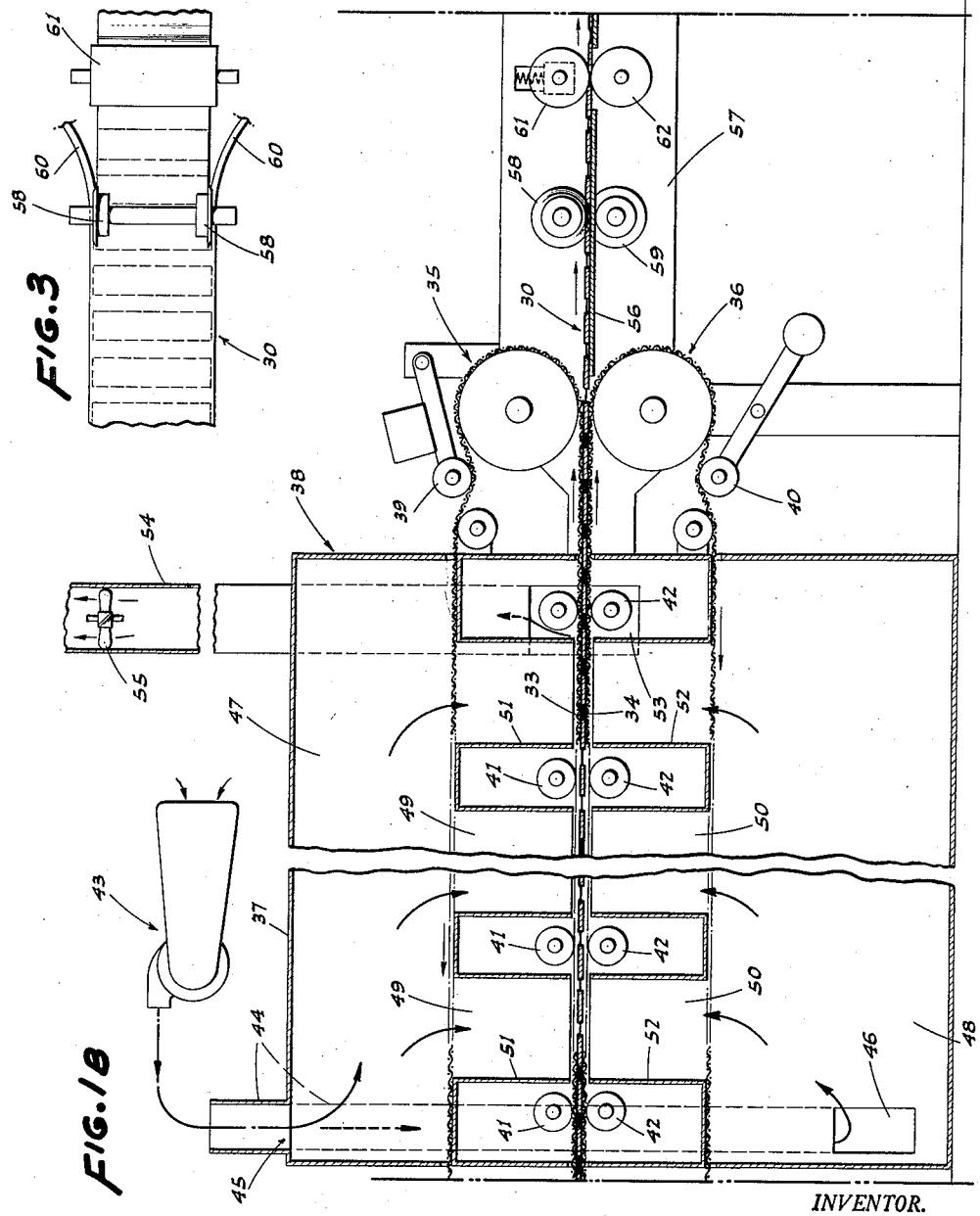

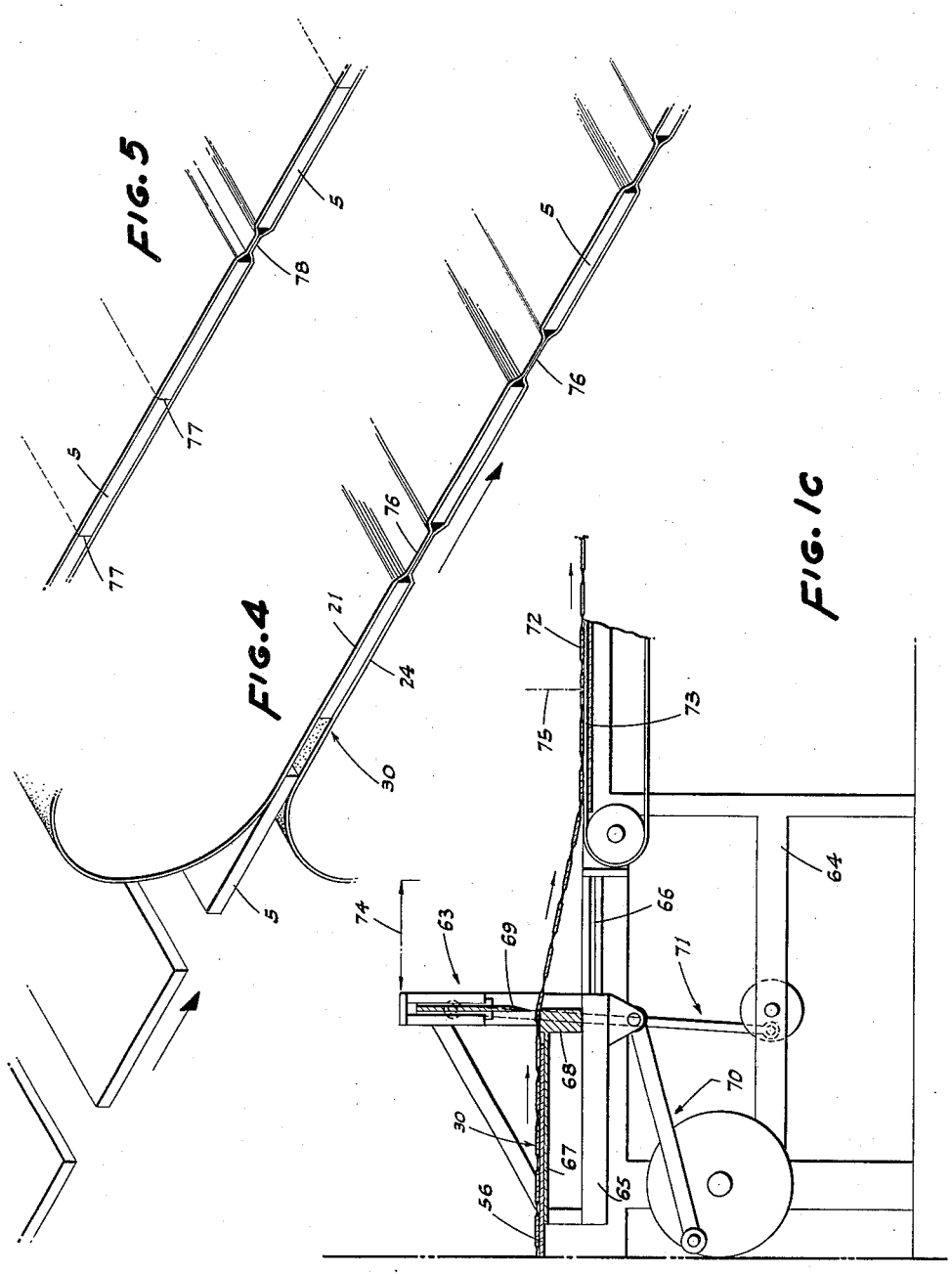

2,991,214
METHOD OF MANUFACTURING COMPOSITE PAPER AND VENEER SHEET MATERIAL
Claude A. Burkholder, Fresno, Calif., assignor to General Box Distributors, San Francisco, Calif., a corporation of California
Continuation of abandoned application Ser. No. 443,793, July 16, 1954. This application Jan. 17, 1956, Ser. No. 559,730
3 Claims. (Cl. 154—118)

This invention is directed to the manufacture of composite paper and wood veneer sheet material, and—as a major object—provides a novel method of producing the same.

Such material is comprised of outer laminations of heavy-duty paper, such a "kraft," and an intermediate lamination of wood veneer; the intermediate lamination—in the present embodiment—being initially separate, transversely extending sections or slots of wood veneer, full width of the sheet but relatively narrow longitudinally thereof, and adhesively engaged or bonded between the outer laminations of paper. Such material is especially adapted—but not limited—for use in the manufacture of boxes.

Another important object of the present invention is to provide a manufacturing method whereby such composite paper and wood veneer sheet material is produced continuously—i.e. in an unbroken run; being only severed into individual sheets as a final step in the operation. By virtue of such continuous production or run, the material is manufactured rapidly; quality is readily controlled and maintained to certain standards; and in-line, automatic apparatus can be conveniently and advantageously used.

An additional object of the invention is to provide a novel method, of manufacturing composite paper and wood veneer sheet material, which includes—generally —the steps of feeding the paper in initially separate but predetermined relation, then laminating the veneer between the paper after an adhesive has been applied to the proper faces of such paper, and subsequently advancing the resultant composite sheet material in a confined, unbroken run through a kiln, wherein such sheet is subjected to conditions of continuous pressure, and heat, whereby to effectively bond the laminations and dry the material; said material, in a continuation of the run, being edge-trimmed and then cut into individual longitudinal panels or sheets.

A further object of the invention is to provide a manufacturing method, as in the preceding paragraph, in which the condition of continuous pressure in the kiln is obtained by carrying the material through said kiln between longitudinally tensioned, closely adjacent runs of metallic, foraminous conveyors which are subjected to pressure in the direction of each other, and in which the condition of heat in the kiln is attained by continuously circulating heated air therein about the conveyor runs and the composite sheet material forcefully engaged therebetween.

It is also an object of the invention to provide a manufacturing method, for the purpose described, which is economical and efficient in practice.

Still a further object of the invention is to provide a practical and reliable method of manufacturing composite paper and wood veneer sheet material.

The instant application is a continuation of Serial No. 443,793, filed July 16, 1954, under the same title and now abandoned.

The method is practiced by means of such structure and relative arrangement of parts as will fully appear by a perusal of the following specification and claims.

In the drawings:

FIGS. 1A, 1B, and 1C are—collectively—a diagrammatic side elevation of the preferred apparatus for the practice of the manufacturing method; FIG. 1A illustrating the veneer feeding unit, the initial conveyor assembly, and the unit for applying the adhesive and laminating the paper and veneer; FIG. 1B illustrating—foreshortened—the kiln, the rotary edge trimming knives, and the final pressure and tension rolls; and FIG. 1C illustrating the traveling cut-off knife.

FIG. 2 is a fragmentary diagrammatic plan view of the initial conveyor assembly.

FIG. 3 is a fragmentary diagrammatic plan view showing the upper, edge trimming, rotary knives and the upper one of said final pressure and tension rolls.

FIG. 4 is an enlarged fragmentary perspective view showing the paper and wood veneer as initially separate, and as subsequently laminated, with the veneer spaced apart.

FIG. 5 is an enlarged fragmentary perspective view of the composite paper and wood veneer sheet material as formed with certain of the adjacent veneer sections in edge to edge engagement, and other adjacent sections in spaced relation.

The various driven and rotary parts of the device, here shown diagrammatically, are in practice interconnected with—and driven by—suitable power mechanism (not shown), which actuates said parts in predetermined timed or synchronized relation, as required for a continuous sheet forming operation.

Referring now more particularly to the drawings, and to the characters of reference marked thereon, the method, and the diagrammatically shown apparatus used for the practice thereof, comprises—at the start of the production line—an upstanding, longitudinally extending frame 1, which frame supports a horizontal, longitudinal, wood veneer delivery conveyor, indicated generally at 2.

The wood veneer delivery conveyor, which is driven with its upper run traveling forwardly, includes transversely spaced, endless chains 3 which carry outwardly projecting, longitudinally spaced, veneer pusher lugs 4; corresponding lugs on the chain 3 being in transverse alinement.

As the upper run of the conveyor 2 advances, a transversely extending wood veneer section or slat 5 is delivered thereto, spanning between, and being supported by, the endless chains 3 ahead of each transversely alined pair of the pusher lugs 4.

The veneer sections 5 are delivered onto the upper run of the conveyor 2, in transverse position and with proper spacing longitudinally thereof, in mutiples and by the veneer feeding unit shown generally at 6. Such veneer feeding unit 6 includes a plurality of vertical, transverse hoppers 7, each of which receives a stack 8 of the veneer sections 5.

Recurringly, and by mechanism not here shown, the veneer feeding unit 6 drops the lowermost veneer sections 5 from all of the hoppers 7 onto the upper run of the conveyor 2; i.e., onto the chains 3 ahead of corresponding pairs of the pusher lugs 4. The timing is such that the veneer feeding unit 6 works to maintain the upper run of the conveyor 2 full—ahead of said unit—of veneer sections 5 at all times. The veneer feeding unit 6 is shown and described in detail in my copending application for United States patent, Serial No. 450,153, filed August 16, 1954, on Veneer Feeder and Conveyor Unit, now Patent No. 2,744,551.

Adjacent the forward end of the upper run of the veneer delivery conveyor 2, the longitudinal row of veneer sections 5 is engaged, and while maintaining the relationship of said sections is advanced beyond the forward end of the conveyor 2, by a transfer conveyor, indicated generally at 9, to a discharge point 10.

The transfer conveyor 9 includes pairs of upper and lower chains 11 and 12, with the chains of each pair in transversely spaced relation; the chains of said pairs having adjacent longitudinal runs 13 and 14 which travel forwardly and frictionally engage the veneer sections 5 from above and below, respectively.

Immediately beyond the discharge point 10 the apparatus includes cooperating nip rolls 15 and 16 which form a part of a unit, indicated generally at 17, for applying adhesive to the runs of paper, as hereinafter described, and for laminating the row of veneer sections 5 between said runs.

The unit 17 includes, between upstanding side frames 18, and above and below the nip rolls 15 and 16, a plurality of upper and lower direction-changing rolls 19 and 20, respectively.

An upper run 21 of paper, from a spool 22 thereof journaled in connection with the frame 1, is directed in guided relation on an overhead frame 23 to the upper direction-changing rolls 19, while a lower run 24 of paper is guided from another spool of paper 25, likewise journaled in connection with the frame 1, and is thence trained about the lower direction-changing rolls 20.

From the adjacent ones of the upper and lower direction-changing rolls 19 and 20, the corresponding runs 21 and 24 of paper lead to and pass from the rear about the nip rolls 15 and 16, advancing therefrom in closely adjacent relation.

Upper and lower transfer rolls 26 and 27 run in engagement with intermediate ones of the upper and lower direction-changing rolls 19 and 20, respectively; the rolls 26 and 27 running, at the bottom, in troughs 28 and 29 containing a liquid adhesive. Upon rotation of the rolls 26 and 27 they transfer a controlled, evenly spread quantity of the liquid adhesive from the troughs 28 and 29 to the contacting upper and lower direction-changing rolls 19 and 20, respectively. From said direction-changing rolls the adhesive is transferred onto the faces of the runs 21 and 24 of paper which lie in adjacent relationship after said runs pass about the nip rolls 15 and 16.

Simultaneously, with the runs 21 and 24 of paper passing about the nip rolls 15 and 16, the row of veneer sections 5 is fed from the transfer conveyor 9 between said nip rolls and the runs of paper traveling thereabout; thus forming, from and beyond said nip rolls, a composite paper and wood veneer sheet material, indicated at 30.

Disposed immediately ahead of the nip rolls 15 and 16, and between the upstanding side frames 8, are longitudinally spaced, cooperating pairs of upper and lower initial pressure and feed rolls; the upper ones of said rolls being indicated at 31, and the lower ones of said rolls being indicated at 32. These cooperating, initial pressure and feed rolls impart a compression on the sheet material 30, and also serve to assure of continued advance at a predetermined speed of such material.

From the rolls 31 and 32 the material 30 continues to advance in an unbroken or continuous sheet, being then engaged for a substantial distance between closely adjacent runs 33 and 34 of elongated, upper and lower endless conveyors, indicated generally at 35 and 36.

Intermediate the ends thereof the endless conveyors 35 and 36 pass through an enclosed housing 37 of a kiln, indicated generally at 38. The structure of the kiln is the subject of copending application for United States Letters Patent, Serial No. 451,903, filed August 24, 1954 now Patent No. 2,818,660, on Drier for Composite Paper and Veneer Sheet Material.

The endless conveyors 35 and 36 are metallic foraminous or screen-like type, and said conveyors are maintained under relatively great longitudinal tension by counter-weighted belt tighteners, indicated at 39 and 40; such tension being of particularly advantage in the forwardly traveling runs 33 and 34, as will hereinafter appear.

In addition to the tension on the runs 33 and 34 the same are maintained under pressure in a direction toward each other by a plurality of longitudinally spaced, upper and lower pressure rolls 41 and 42, respectively, journaled in the housing 37 of the kiln 38.

As the runs 33 and 34 travel forwardly at the same speed, the sheet material 30 is likewise carried forward between said runs in close confinement and frictional engagement; such frictional engagement being caused by said runs being closely adjacent, under tension, and subject to pressure. This not only assures of positive advance of the unbroken sheet material 30 through the kiln 38, but simultaneously subjects the confined material to a continuous bonding compression through the length of said kiln, which bonding is further enhanced by reason of the fact that material—while in the kiln—is subjected to a condition of heat in the following manner:

An air heater and blower unit 43 supplies heated air, under pressure, through a duct system 44 to an upper inlet 45 and a lower inlet 46 at the front end of the kiln housing 37. From the inlets 45 and 46 the heated air is delivered, with force-feed, into upper and lower main chambers 47 and 48 of the kiln, and which chambers communicate with vertical upper and lower passages 49 and 50 which lead to the runs 33 and 34 between hoods 51 and 52 which encompass the upper pressure rolls 41 and the lower pressure rolls 42, respectively.

With this arrangement heated air—in circulation—is imposed on the runs 33 and 34, together with the sheet material 30 therebetween in the length of travel through the kiln 30; the heat having the effect of improving the bond between the laminations—i.e. between the paper and wood veneer—and of drying the sheet material 30.

After circulating through the kiln housing 37, which is shown foreshortened in FIG. 1B, but which in practice is quite long, the air and the moisture carried thereby from the sheet material 30 pass into an outlet 53 and are carried away in an exhaust stack 54 having an exhaust fan 55 therein.

While in the present installation a single air heater and blower unit 43 is shown, in practice it is contemplated that a number of these units may be employed in connection with the kiln 38.

After passing through the kiln 38 between the runs 33 and 34, and delivering from the discharge end of the endless conveyors 35 and 36, the sheet material 30 is received on a horizontal bed 56 supported by a frame 57.

Upper and lower pairs of transversely spaced rotary knives, indicated at 58 and 59, are journaled in connection with the frame 57; corresponding ones of said knives 58 and 59 working in cooperation to trim the edges of the sheet material 30 in the manner particularly shown in FIGS. 1B, and 3; the trimmed edge portions being indicated at 60.

Beyond the bed 56 the edge-trimmed sheet material 30 passes between upper and lower pressure and tension rolls, indicated at 61 and 62, respectively, which rolls not only assure of continued advance of the sheet material 30, but impose a final bonding compression thereon.

Forwardly of the rolls 61 and 62 the apparatus embodies a traveling cut-off knife unit, indicated at 63, which comprises an upstanding frame 64 on which a longitudinally reciprocal carriage 65 is mounted for to and fro motion by means including guideways, one of which is shown at 66.

A bed 67 fixed in connection with carriage 65 cooperatively engages in reciprocable relation with a fixed extension of the bed 56; the bed 67 and said extension being adapted to receive the sheet material 30 from the rolls 61 and 62. There is a cut-off anvil 68 at the forward end of the bed 67, and a vertically reciprocal transverse cut-off knife 69 is frame-mounted in connection with the carriage 65, and is disposed to work in cooperation with the anvil 68. The carriage 65 is reciprocated—in predetermined timed relation to forward movement of the sheet material 30—by an eccentric drive mechanism 70, while the cut-off knife 69 is likewise actuated in timed relation by an eccentric drive mechanism 71.

The above described traveling cut-off knife unit 63 is synchronized to the speed of travel of the sheet material in a manner such that said unit recurringly travels forwardly with said sheet material at the same speed, and during the course of such travel the knife 69 lowers and transversely severs the sheet material into a separate length or panel, one of which is indicated at 72 in FIG. 1C. The timing is such that each panel 72 is of a predetermined length, and said panels—as they deliver from the traveling cut-off knife unit 63—are received on an endless, longitudinal, carry-off conveyor 73; the stroke of the unit 63 being indicated by the arrow 74, while the line of cut between the panels 72 is indicated by the broken line 75, both in FIG. 1C.

From the conveyor 73 the panels 72 of composite paper and veneer sheet material are removed and stacked.

In FIG. 4, wherein there is an enlarged fragmentary perspective illustration of the composite paper and veneer sheet material, partly as initially separate and partly as subsequently laminated, it is to be noted that between the longitudinally spaced wood veneer sections 5, the upper and lower runs 21 and 24—respectively—of paper are adhesively directly engaged or bonded together, as at 76. The remaining portions of the runs 21 and 24 of paper are of course effectively bonded to the wood veneer sections 5. In order to do this, it is necessary that the spacing between the slats shall be wide enough to allow the paper runs to be brought together and bonded between the slats without undue stretching or distortion of the paper.

The composite paper and wood veneer sheet material produced by the present method is well adapted for many uses, including fabrication of produce boxes such as shown, for example, in copending application for United States patent, Serial No. 447,225, filed August 2, 1954, on Box, now Patent No. 2,758,739.

When the wood veneer sections 5 of the intermediate lamination are to be in spaced relation longitudinally of the run, as hereinbefore described, such spacing is controlled by adjusting the hoppers 7 and the pusher lugs 4, both of which are mounted for adjustment longitudinally of the direction of travel.

In certain instances it is desired to produce the sheet material with the wood veneer sections 5 all in edge-to-edge engagement, or with certain adjacent ones in edge-to-edge engagement and other adjacent ones spaced, as in FIG. 5. In this latter embodiment the numeral 77 indicates the line of edge-to-edge engagement, and the numeral 78 indicates the point at which the runs 21 and 24 of paper are directly bonded together between the spaced wood veneer sections.

To produce sheet material with all of the wood veneer sections in edge-to-edge engagement, or with certain thereof engaged and others spaced—all in predetermined order—the delivery conveyor 2 and the transfer conveyor 9 are selectively arranged and function as contemplated in the previously noted Patent No. 2,744,551, on Veneer Feeder and Conveyor Unit.

With the described manufacturing method, composite paper and veneer sheet material of high and accurately controlled quantity is produced rapidly and effectively; all with a minimum of manual attention.

From the foregoing description it will be readily seen that there has been produced such a method of manufacture as will substantially fulfill the objects of the invention, as set forth herein.

While this specification sets forth herein the present and preferred steps of the method of manufacture, still in practice such deviations therefrom may be resorted to as do not form a departure from the spirit of the invention, as defined by the appended claims.

Having thus described the invention, the following is claimed as new and useful, and upon which Letters Patent are desired:

1. In the method of continuous manufacture of composite sheet material having longitudinal runs of paper as outer laminations, and transversely extending wood veneer slats adhesively bonded in a longitudinal row between said runs of paper; the steps of forming said row of wood veneer slats with certain slats of the row spaced apart at adjacent edges longitudinally of the row, initially separately advancing the runs of paper and said row while maintaining such spacing of said certain slats, applying an adhesive to the inner face of each of the runs of paper while so advancing, laminating the row of wood veneer slats between said runs of paper into a continuously advancing composite sheet material wherein such spacing of said certain slats is maintained, and then subjecting said continuously advancing composite sheet material to compression to bond the runs of paper to the slats and said runs to each other in the spaces between said certain slats.

2. The method of forming composite sheet material from longitudinal paper runs and wood veneer slats, comprising applying adhesive over the inner face of the paper runs, disposing the paper runs with the slats therebetween in spaced relation lengthwise of the runs, applying pressure against the runs from the outer face thereof while advancing the same with the slats to thus bond the paper to the slats, and subsequently applying pressure to the runs between the slats to bond the runs to each other.

3. A method, as in claim 2, in which the length of the spaces between said slats is sufficiently greater than the thickness of the slats to enable the paper runs to be brought into contact with each other for a material portion of such length while maintaining the paper substantially unstretched.

References Cited in the file of this patent

UNITED STATES PATENTS

| | | |
|---|---|---|
| 1,461,724 | Cooper | July 17, 1923 |
| 2,459,295 | Skoog | Jan. 18, 1949 |
| 2,546,721 | Campbell | Mar. 27, 1951 |
| 2,593,709 | Ware et al. | Apr. 22, 1952 |
| 2,719,808 | Elmendorf | Oct. 4, 1955 |
| 2,737,764 | Lewis | Mar. 13, 1956 |
| 2,744,046 | Ware et al. | May 1, 1956 |
| 2,761,804 | Christian et al. | Sept. 4, 1956 |
| 2,772,717 | Ware | Dec. 4, 1956 |